(12) United States Patent
Gandon-Pain

(10) Patent No.: US 7,312,264 B2
(45) Date of Patent: Dec. 25, 2007

(54) PROCESS FOR OBTAINING A GRAFTED ELASTOMER HAVING FUNCTIONAL GROUPS ALONG THE CHAIN AND A RUBBER COMPOSITION

(75) Inventor: Sylvie Gandon-Pain, Lyons (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 8 days.

(21) Appl. No.: 11/256,986

(22) Filed: Oct. 25, 2005

(65) Prior Publication Data

US 2006/0089445 A1    Apr. 27, 2006

Related U.S. Application Data

(63) Continuation of application No. PCT/EP2004/004510, filed on Apr. 29, 2004.

(30) Foreign Application Priority Data

Apr. 29, 2003  (FR) .................................. 03 05305

(51) Int. Cl.
*C08K 5/00* (2006.01)
(52) U.S. Cl. ...................... 524/236; 524/254; 524/257; 524/492; 525/291
(58) Field of Classification Search ............... 524/236, 524/254, 257, 492; 525/291
See application file for complete search history.

(56) References Cited

U.S. PATENT DOCUMENTS 5,804,619 A    9/1998  Nicol et al.
6,765,065 B2 *  7/2004  Oshima et al. ............. 525/272

FOREIGN PATENT DOCUMENTS

| EP | 1000971 A | 5/2000 |
|---|---|---|
| FR | 2361424 A | 3/1978 |
| GB | 1575115 A | 9/1980 |
| WO | WO 97/14726 A | 4/1997 |
| WO | WO 00/68307 A | 11/2000 |
| WO | WO 01/90237 A | 11/2001 |

OTHER PUBLICATIONS

Marvel C. S. et al, "Polybutadiene Modified By Addition of Thiols Containing Polar Groups", Industrial and Engineering Chemistry, American Chemical Society, US, vol. 45, No. 9, 1953, pp. 2090-2093, XP002144506.

* cited by examiner

*Primary Examiner*—Peter D. Mulcahy
(74) *Attorney, Agent, or Firm*—Buchanan Ingersoll & Rooney PC

(57) ABSTRACT

A process for obtaining a grafted diene elastomer having functional groups along the chain, a rubber composition containing this grafted elastomer and having in particular improved hysteresis properties in the cross-linked state, a preparation process for this composition, a tire tread made from this composition and a tire of reduced rolling resistance which incorporates this tread. A process for obtaining this grafted elastomer includes a radical grafting reaction carried out in solution or without a solvent by means of a reagent of the mercaptan type to graft functional groups on to the chain of a starting elastomer. The starting elastomer is treated with an antioxidant having at least one aromatic amine function before the grafting reaction, so that the grafted elastomer has a macrostructure which is practically identical to that of the starting elastomer. A rubber composition containing the grafted diene elastomer includes a reinforcing inorganic filler, and the grafted elastomer preferably has a molar ratio of units originating from conjugated dienes greater than 30%.

29 Claims, No Drawings

PROCESS FOR OBTAINING A GRAFTED ELASTOMER HAVING FUNCTIONAL GROUPS ALONG THE CHAIN AND A RUBBER COMPOSITION

CROSS-REFERENCE TO RELATED APPLICATIONS

This application is a continuation of International Application No. PCT/EP2004/004510, filed Apr. 29, 2004, published in French on Nov. 11, 2004 as WO 2004/096865, and claims priority based on French Application No. 03/05305, filed Apr. 29, 2003, the disclosures of both applications being incorporated herein in their entirety.

BACKGROUND OF THE INVENTION

The present invention relates to a process for obtaining a grafted diene elastomer comprising functional groups along the chain, a rubber composition comprising this grafted elastomer and having in particular improved hysteresis properties in the cross-linked state, and to a preparation process for this composition. The invention also relates to a tire tread comprising this composition and a tire of reduced rolling resistance which incorporates this tread.

DESCRIPTION OF RELATED ART

Since fuel economies and the need to preserve the environment have become priorities, it has become desirable to produce mixes having good mechanical properties and as low a hysteresis as possible so that they can be processed in the form of rubber compositions usable for the manufacture of various semi-finished products involved in the constitution of tires, such as, for example, underlayers, sidewalls or treads, and in order to obtain tires having reduced rolling resistance.

To achieve such an objective, numerous solutions have been proposed, consisting in particular of modifying the structure of the diene polymers and copolymers at the end of polymerization by means of functionalizing, coupling or starring agents. The very great majority of these solutions have concentrated on the use of functionalized polymers which are active with respect to carbon black, with the aim of obtaining a good interaction between the polymer thus modified and the carbon black.

By way of illustration of this prior art relating to reinforcing fillers formed of carbon black, mention may for example be made of U.S. Pat. No. 3,135,716, which describes the reaction of living diene polymers at the chain end with a polyfunctional organic coupling agent in order to obtain polymers having improved properties. Mention may also be made of U.S. Pat. No. 3,244,664, which discloses the use of tetra-alkoxysilanes as coupling agents or starring agents for diene polymers.

Silica has been used as reinforcing filler in cross-linkable rubber compositions, in particular those intended to constitute tire treads, for a long time. However, this use has remained very limited, owing to the unsatisfactory level of certain physical properties of such compositions, in particular abrasion resistance.

This is why it has been proposed, in order to overcome these drawbacks, to use functionalized diene polymers instead of the non-functionalized polymers which were used before, and in particular polymers functionalized by alkoxysilane derivatives, such as tetraethoxysilanes. For example, mention may be made of U.S. Pat. No. 5,066,721, which describes a rubber composition comprising a diene polymer functionalized by an alkoxysilane having at least one non-hydrolyzable alkoxyl radical, which makes it possible to eliminate the polymerization solvent by steam stripping.

One disadvantage of these functionalization reactions lies in the coupling reactions which accompany them, which generally makes it necessary to use an excess of alkoxysilane and/or intensive mixing in order to minimize these coupling reactions.

Another drawback of these reactions lies in the later carrying out of the steam stripping operation, which is necessary to eliminate the polymerization solvent.

In fact, generally, experience shows that the functionalized polymers obtained undergo changes in macrostructure during this stripping operation, which results in serious degradation of their properties, unless one is limited to using as functionalizing agent an alkoxysilane belonging to a restricted family, such as that described in the aforementioned document U.S. Pat. No. 5,066,721.

Consequently, it emerges from the above that the use of diene polymers comprising an alkoxysilane function to obtain rubber compositions comprising silica as reinforcing filler is not satisfactory, despite the improved physical properties of these compositions.

This is why research has been carried out on other functionalization reactions, always with a view to obtaining such rubber compositions.

By way of example, mention may be made of French Patent Specification FR-A-2 740 778 in the name of the Applicant, which discloses the incorporation, in rubber compositions comprising as reinforcing filler silica in a majority proportion (for example comprising a blend of silica and carbon black), of diene polymers bearing at the chain end a silanol function or a polysiloxane block having a silanol end. For example, a functionalizing agent consisting of a cyclic polysiloxane, such as hexamethylcyclotrisiloxane, is used. The functionalized polymers which are obtained can be separated from the reaction medium resulting in their formation by steam extraction of the solvent, without their macrostructure and, consequently, their physical properties, changing.

Mention may also be made of European Patent Specification EP-A-877 047, which discloses the incorporation of such polymers having a silanol function in rubber compositions comprising as reinforcing filler carbon black having silica fixed to its surface.

It has been possible to establish that these polymers impart rubber properties, in particular hysteresis and reinforcement in the cross-linked state, which are improved compared with those of control compositions based on non-functionalized diene polymers, and which are at least analogous to those of compositions based on diene polymers comprising an alkoxysilane function.

Mention may also be made of European Patent Specification EP-A-692 493, which establishes that diene polymers bearing alkoxysilane groups and an epoxy group at the chain end result in improved reinforcement properties and in reduced hysteresis losses at low and high deformations.

One disadvantage of these polymers, which comprise a functional group which is active for coupling to silica or to carbon black surface-modified by silica, is that the improvement in the hysteresis and reinforcement properties which they impart to the rubber compositions incorporating them is generally accompanied by a processing ability of the non-cross-linked mixes which is compromised compared with that of non-functionalized "control" polymers.

Among the other functionalization reactions studied, mention may be made, for example, of functionalization along the chain by carboxylic acid groups.

This carboxylic acid functionalization along the chain can be brought about by direct metallation, in the presence of N,N,N',N'-tetramethylethylenediamine (TMED), by means of butyllithium or metallic sodium (as described in documents U.S. Pat. No. 3,978,161 and U.S. Pat. No. 3,976,628, respectively), followed by carbonation by means of carbon dioxide.

Such a process has the disadvantage of generally resulting in breaks in the chain of the modified polymer.

This carboxylic acid functionalization along the chain may also be brought about by means of carbon monoxide, either by hydroformylation followed by oxidation of the aldehyde formed (as described in U.S. Pat. No. 4,912,145), or by direct hydrocarboxylation of the polymer (as described in the article "A. Nait Ajjou, H. Alper, Macromolecules 29, 1784 (1996)"). The catalysts used for these reactions are rhodium- or palladium-based.

One disadvantage of this functionalization by carbon monoxide lies, firstly, in the drastic nature of the operating conditions and, secondly, in the frequent formation of a gel in the reaction medium.

Carboxylic acid functionalization along the chain by means of maleic anhydride is more widespread. It makes it possible to obtain succinic anhydride units along the chain, which are precursors of the carboxyl groups. Reference may be made to patent specifications U.S. Pat. No. 4,082,817 and U.S. Pat. No. 4,082,493 for examples of such functionalization.

However, this functionalization may also result in the formation of a gel.

U.S. Pat. No. 5,804,619 discloses bitumen/polymer compositions formed of a bituminous matrix in which is distributed a diene elastomer functionalized by carboxyl functional groupings, which is obtained by a grafting reaction of the diene elastomer with a precursor compound of the sequences having carboxyl functionality in the presence of a blocked phenol, alone or in association with a dialkenyl triphosphite, which prevents cross-linking of the elastomer during the grafting operation.

These compositions are usable as road surfacings or as watertight facings.

European Patent Specification EP-A-1 000 971 discloses tread rubber compositions which are essentially intended to have improved grip on wet ground and reduced rolling resistance. These compositions comprise any known reinforcing filler and a grafted copolymer comprising carboxylic acid groups along the chain, which is obtained from a starting copolymer prepared in solution resulting from a diene and a vinyl aromatic compound. These groups may for example be introduced following the copolymerization by means of a radical grafting reaction performed via a carboxylmercaptan, such as 3-mercaptopropionic acid, and a radical initiator, such as dilauroyl peroxide.

One major disadvantage of elastomers grafted by means of this carboxylmercaptan is that they exhibit significant changes in macrostructure relative to the starting elastomers, which result in particular in significant increases in Mooney viscosity, number-average molecular weight and polydispersity index. The result is an undesirable change in the physical properties of the elastomers following grafting.

SUMMARY OF THE INVENTION

One aim of the present invention is to overcome this drawback, and it is achieved by implementing a process for obtaining a grafted diene elastomer comprising functional groups along its chain, comprising a radical grafting reaction which is performed in solution or without a solvent by means of a reagent of mercaptan type and which is intended to graft said groups on to the chain of the starting elastomer and comprises a step of antioxidant treatment, before said radical grafting reaction, by means of an antioxidant comprising at least one aromatic amine function.

Owing to the process of the invention, the diene elastomer thus treated, after grafting, has a macrostructure which is practically identical to that of the starting elastomer; preferably, its Mooney viscosity in particular, measured in accordance with Standard ASTM D-1646, does not deviate by more than 10 points, more preferably 5 points, from its initial viscosity before grafting.

DETAILED DESCRIPTION OF THE INVENTION

"Diene elastomer" is understood to mean, in known manner, an elastomer (homopolymer or copolymer) which has resulted at least in part from diene monomers (monomers bearing two double carbon-carbon bonds, whether conjugated or not).

Preferably, said starting elastomer comprises a molar ratio of units originating from conjugated dienes greater than 30%, which makes it usable to constitute the elastomer matrix of a tire tread composition.

It will be noted that certain diene elastomers, such as butyl rubbers, nitrile rubbers or copolymers of dienes and alpha-olefins of the EPDM type, for example, cannot be used in tread compositions owing to their content of units of diene origin which is very much less than 30%.

Even more preferably, said starting elastomer is a "highly unsaturated" diene elastomer, that is to say, a diene elastomer having a content of units of diene origin (conjugated dienes) which is greater than 50%.

As starting elastomer, there may be used a homopolymer obtained by polymerization in solution of a conjugated diene monomer having 4 to 12 carbon atoms, such as a polybutadiene or a polyisoprene, or alternatively a copolymer obtained by copolymerization in solution of one or more conjugated dienes together or with one or more vinyl aromatic compounds having 8 to 20 carbon atoms, such as a butadiene/vinyl aromatic compound or butadiene/vinyl aromatic compound/isoprene copolymer.

Suitable conjugated dienes are, in particular, 1,3-butadiene, 2-methyl-1,3-butadiene, 2,3-di(C1 to C5 alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, for example, styrene, ortho-, meta- and para-methylstyrene, the commercial mixture "vinyltoluene", para-tert.butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units, and may have any microstructure which is a function of the polymerization conditions used, in particular of the presence or absence of a modifying and/or randomizing agent and of the quantities of modifying and/or randomizing agent used. The elastomers may for example be block, random, sequential or microsequential elastomers.

Preferred are polybutadienes, and in particular those having a content of 1,2-units of between 4% and 80%, or those having a content of cis-1,4 of more than 80%, synthetic polyisoprenes, butadiene/styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature Tg of −40° C. to −80° C., isoprene/styrene copolymers and in particular those having a styrene content of between 5% and 50% by weight and a Tg of between −25° C. and −50° C.

In the case of butadiene/styrene/isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

Particularly preferably, said starting elastomer is selected from the group of "highly unsaturated" diene elastomers prepared in solution which consists of polybutadienes (BR), synthetic polyisoprenes (IR), butadiene/styrene copolymers (SBR), butadiene/isoprene copolymers (BIR), isoprene/styrene copolymers (SIR) or butadiene/styrene/isoprene copolymers (SBIR).

Even more preferably, said starting elastomer belongs to the family consisting of polybutadienes, butadiene/styrene copolymers and butadiene/styrene/isoprene copolymers prepared in solution.

Advantageously, said starting elastomer is a butadiene/styrene copolymer prepared in solution.

According to an advantageous example of embodiment of the invention, said starting elastomer is a butadiene/styrene copolymer prepared in solution having a styrene content of between 20% and 30% by weight, a content of vinyl bonds of the butadiene fraction of between 15% and 65%, a content of trans-1,4 bonds of between 15% and 75% and a Tg of between −20 and −55° C.

The aforementioned starting elastomers which are obtained for example in solution from any anionic initiator, be it monofunctional or polyfunctional, or non-anionic initiator, are usable in the invention. However, an anionic initiator containing an alkali metal such as lithium, or an alkaline-earth metal such as barium, is preferably used.

Suitable organolithium initiators are in particular those comprising one or more carbon-lithium bonds. Mention may be made, for example, of aliphatic organolithiums, such as ethyllithium, n-butyllithium (nBuLi), isobutyllithium, and dilithium polymethylenes such as 1,4-dilithiobutane.

Lithium amides, which are obtained from an acyclic or cyclic secondary amine, such as pyrrolidine or hexamethyleneimine, may also be used.

Also usable in the invention are diene elastomers which are initiated by compounds of transition metals, such as compounds of titanium, cobalt or nickel, for example, or by rare earths, such as neodymium.

The polymerization, as is known to the person skilled in the art, is preferably carried out in the presence of an inert solvent which may for example be an aliphatic or alicyclic hydrocarbon such as pentane, hexane, iso-octane, cyclohexane, methylcyclohexane or cyclopentane, or an aromatic hydrocarbon such as benzene, toluene or xylene. This polymerization may be carried out continuously or discontinuously. It is generally effected at a temperature of between 20° C. and 120° C., preferably between 30° C. and 100° C.

The antioxidant treatment according to the invention to which said starting diene elastomer is subjected is performed by means of at least one antioxidant, comprising at least one aromatic amine function during said grafting reaction, which is provided to trap the free radicals formed so as to minimize the interactions of said radicals with the chain of said elastomer.

According to one variant embodiment, said antioxidant furthermore comprises at least one phenol function which is preferably sterically hindered.

According to another variant embodiment, furthermore at least one second antioxidant comprising at least one phenol function which is preferably sterically hindered and which is devoid of aromatic amine function, or an antioxidant of dialkylphenyl triphosphite type, etc., is used. Advantageously, said or at least one of said antioxidant(s) of aminated type is selected from the group consisting of naphthylamines, diphenylamines and p-phenylenediamines.

The antioxidant(s) of phenolic type is/are selected from the group consisting of trialkyl phenols, hydroquinones and polyphenols (for example, pyrogallol may be used as polyphenol).

According to one variant embodiment, advantageously, the antioxidant treatment comprises a second step after the radical grafting reaction.

This antioxidant treatment is preferably carried out by means of a quantity of said antioxidant(s) of from 0.2 phr to 1 phr (phr: parts by weight per hundred parts of said starting diene elastomer).

The reagent of mercaptan type according to the invention, which is used for the radical grafting reaction to which said starting elastomer thus treated is subjected, comprises a functional group belonging to the family consisting of hydroxyl, carbonyl, ether, amine, nitrile and silane groups, so that the grafted elastomer obtained comprises along its chain hydroxyl, carbonyl, ether, amine, nitrile or silane groups, respectively, as desired.

According to an advantageous example of embodiment of the invention, said reagent of mercaptan type comprises a carbonyl functional group belonging to the family consisting of carboxylic acid, carboxylic acid ester, amide and ketone groups, so that said grafted elastomer comprises along its chain carboxylic acid, carboxylic acid ester, amide or ketone groups as desired.

Even more advantageously, said reagent of mercaptan type, such as a mercaptopropionic or mercaptoundecanoic acid, comprises a carboxylic acid functional group, so that said grafted elastomer comprises carboxylic acid groups along its chain.

Said grafting reaction is possibly carried out in the presence of a radical initiator, such as a peroxide.

Another object of the invention is any grafted diene elastomer comprising functional groups along its chain which is capable of being obtained by the process described below.

Another object of the invention is to propose a novel cross-linkable or cross-linked rubber composition, which exhibits reduced hysteresis losses in the cross-linked state, improved processing ability in the non-cross-linked state and which is usable to constitute a tire tread.

This object is achieved in that the Applicants have recently surprisingly discovered that a cross-linkable or cross-linked rubber composition obtained by the association with a reinforcing inorganic filler of said grafted diene elastomer having a molar ratio of units originating from conjugated dienes of greater than 30%, which comprises said functional groups along its chain and which is obtained by said radical grafting reaction, which is performed in solution or without a solvent by means of said reagent of mercaptan type and is intended to graft said groups onto the chain of said starting diene elastomer, said grafted elastomer being capable of being obtained by an antioxidant treatment, using at least one antioxidant comprising at least one aromatic amine function, applied to said starting elastomer prior to said grafting reaction, so that said grafted elastomer has a macrostructure practically identical to that of said starting elastomer, has reduced hysteresis losses at low and high deformations which are analogous to those of known compositions based on polymers comprising functional groups which are active for coupling to silica (such as the aforementioned alkoxysilane or silanol groups), while having processing properties in the non-cross-linked state which are improved compared with those of these known compositions filled with silica and which are comparable to those of compositions filled with silica based on non-functionalized polymers.

These characteristics make the composition according to the invention usable for constituting a tire tread having in particular reduced rolling resistance.

Said functional groups which said grafted elastomer comprises preferably belong to the family consisting of hydroxyl, carbonyl, ether, amine, nitrile and silane groups and, even more preferably, said functional groups are of carbonyl type and belong to the family constituted by carboxylic acid, carboxylic acid ester, amide and ketone groups.

Advantageously, said functional groups are of carboxylic acid type.

Said grafted elastomer has resulted preferably:

from a homopolymer obtained by polymerization in solution of a conjugated diene monomer having 4 to 12 carbon atoms, such as a polybutadiene or a polyisoprene, or from a copolymer obtained by copolymerization in solution of one or more conjugated dienes together and/or with one or more vinyl aromatic compounds having 8 to 20 carbon atoms, such as a butadiene/vinyl aromatic compound or butadiene/vinyl aromatic compound/isoprene copolymer.

Even more preferably, said grafted elastomer has resulted from a butadiene/vinyl aromatic compound copolymer prepared in solution.

According to another preferred characteristic of the invention, said rubber composition is such that said grafted elastomer has a number-average molecular weight Mn which is greater than 100,000 g/mol.

According to another preferred characteristic of the invention, said composition is based on an elastomer matrix comprising in a majority proportion said grafted elastomer and, even more preferably, this elastomer matrix is constituted of said grafted elastomer.

Of course, the compositions according to the invention may contain a single grafted diene elastomer such as the one mentioned above or a mixture of several of these grafted elastomers.

The diene elastomer(s) grafted according to the invention may be used alone in the composition according to the invention or in a blend with any other diene elastomer, whether functionalized or not, which is conventionally used in tires.

It will be noted that the improvement in the properties of the composition according to the invention will be all the greater, the lower the proportion of the conventional elastomer(s) in this composition. Advantageously, this or these conventional elastomer(s) may if applicable be present in the composition according to the invention in a quantity of from 1 to 70 parts by weight per 100 parts by weight of grafted elastomer(s) according to the invention.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black (which is considered as being an organic filler in the context of the present description), this inorganic filler being capable, on its own, without any other means than an intermediate coupling agent, of reinforcing a rubber composition intended for the manufacture of tires, in other words capable of replacing a conventional tire-grade carbon black filler in its reinforcement function. Such a filler is characterized generally, in known manner, by the presence of hydroxyl (—OH) groups at its surface.

Preferably, the reinforcing inorganic filler is present in the composition of the invention in a quantity equal to or greater than 40 phr (phr: parts by weight per hundred parts of elastomer(s)). Equally preferably, said reinforcing inorganic filler is present in the reinforcing filler which the composition of the invention comprises in a mass fraction greater than 50% and possibly as much as 100%.

Advantageously, the entirety or at the very least a majority proportion of said reinforcing inorganic filler is silica ($SiO_2$). The silica used may be any reinforcing silica known to the person skilled in the art, in particular any precipitated or fumed silica having a BET surface area and a CTAB specific surface area both of which are less than 450 $m^2/g$, even if the highly dispersible precipitated silicas are preferred.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomer matrix, which can be observed in known manner by electron or optical microscopy on thin sections. As non-limitative examples of such preferred highly dispersible silicas, mention may be made of the silica Perkasil KS 430 from Akzo, the silica BV 3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in patent specification EP-A-735 088.

The physical state in which the reinforcing inorganic filler is present is immaterial, whether it be in the form of a powder, microbeads, granules or balls. Of course, "reinforcing inorganic filler" is also understood to mean mixtures of different reinforcing inorganic fillers, in particular of highly dispersible silicas such as described above.

It will be noted that the reinforcing filler of a rubber composition according to the invention may contain in a blend (mixture), in addition to the aforementioned reinforcing inorganic filler or fillers, carbon black in a minority proportion (that is to say, in a mass fraction of less than 50%). Suitable carbon blacks are any carbon blacks, in particular the blacks of type HAF, ISAF and SAF, which are conventionally used in tires, and particularly in tire treads. As non-limitative examples of such blacks, mention may be made of the blacks N115, N134, N234, N339, N347 and N375.

For example, black/silica blends or blacks partially or entirely covered with silica are suitable to form the reinforcing filler. Also suitable are reinforcing fillers comprising the carbon blacks covered at least in part by an inorganic layer, for example of silica, which for its part requires the use of a coupling agent to establish the bond with the elastomer, such as, although this is not limiting, the fillers sold by CABOT under the name "CRX 2000", which are described in patent specification WO-A-96/37547.

As reinforcing inorganic filler, it is also possible to use, although this is not limiting, aluminas (of formula $Al_2O_3$), such as the high-dispersibility aluminas which are described in European patent specification EP-A-810 258, or alternatively aluminium hydroxides, such as those described in patent specification WO-A-99/28376.

In the event that the reinforcing filler contains only a reinforcing inorganic filler and carbon black, the mass fraction of this carbon black in said reinforcing filler is preferably selected to be less than or equal to 30%.

However, experience shows that the aforementioned properties of the composition according to the invention are improved all the more, the higher the mass fraction of reinforcing inorganic filler contained in the reinforcing filler which the composition comprises, and that said properties are optimum when said composition contains solely a reinforcing inorganic filler, for example silica, as reinforcing filler. This latter case therefore constitutes a preferred example of a rubber composition according to the invention.

The rubber composition according to the invention furthermore comprises, in conventional manner, a reinforcing inorganic filler/elastomer matrix bonding agent (also referred to as coupling agent), the function of which is to ensure sufficient chemical and/or physical bonding (or coupling) between said inorganic filler and the matrix, while facilitating the dispersion of this inorganic filler within said matrix.

"Coupling agent" is understood more precisely to mean an agent capable of establishing a sufficient chemical and/or physical connection between the filler in question and the elastomer, while facilitating the dispersion of this filler within the elastomer matrix. Such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom;

T represents a group making it possible to link Y and X.

Coupling agents must not be confused with simple agents for covering the filler in question which, in known manner, may comprise the "Y" function which is active with respect to the filler but are devoid of the "X" function which is active with respect to the elastomer. Any coupling agent known to or likely to ensure, in the rubber compositions which can be used for the manufacture of tires, the effective coupling between a reinforcing inorganic filler such as silica and a diene elastomer, such as, for example, organosilanes, in particular polysulphurized alkoxysilanes or mercaptosilanes, or alternatively polyorganosiloxanes bearing the X and Y functions mentioned above, may be used. Silica/elastomer coupling agents in particular have been described in a large number of documents, the best known being bifunctional alkoxysilanes such as polysulphurized alkoxysilanes.

In particular polysulphurized alkoxysilanes, which are referred to as "symmetrical" or "asymmetrical" depending on their specific structure, are used, such as those described for example in U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the more recent U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085, EP-A-1 043 357, which describe such known compounds in detail.

Particularly suitable, without the definition below being limitative, are symmetrical polysulphurized alkoxysilanes which satisfy the following general formula (I):

$$Z\text{-}A\text{-}S_n\text{-}A\text{-}Z, \text{ in which:} \qquad (I)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

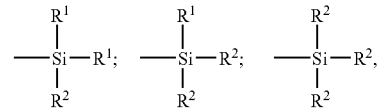

in which:

the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl), the radicals $R^2$, which may or may not be substituted, and may be identical or different, represent a $C_1$-$C_{18}$ alkoxyl group or a $C_5$-$C_{18}$ cycloalkoxyl group (preferably $C_1$-$C_8$ alkoxyl groups or $C_5$-$C_8$ cycloalkoxyl groups, more preferably $C_1$-$C_4$ alkoxyl groups, in particular methoxyl and/or ethoxyl).

In the case of a mixture of polysulphurized alkoxysilanes in accordance with Formula (I) above, in particular conventional, commercially available, mixtures, it will be understood that the average value of the "n"s is a fractional number, preferably of from 2 to 5.

As polysulphurized alkoxysilanes, mention will be made more particularly of the polysulphides (in particular disulphides, trisulphides or tetrasulphides) of bis-(($C_1$-$C_4$)alkoxyl-($C_1$-$C_4$)alkylsilyl-($C_1$-$C_4$)alkyl), such as for example the polysulphides of bis(3-trimethoxysilylpropyl) or of bis(3-triethoxysilylpropyl). Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4). Mention will also be made of tetrasulphurized monoalkoxysilanes, such as monoethoxydimethylsilylpropyl tetrasulphide (abbreviated to MESPT), which are the subject of international patent application PCT/EP02/03774 in the name of the Applicants.

The compositions according to the invention also comprise, in addition to said grafted elastomer and said reinforcing inorganic filler, plasticisers, pigments, antioxidants, antiozone waxes, a cross-linking system based either on sulphur and/or peroxide and/or bismaleimides, cross-linking activators comprising zinc monoxide and stearic acid, extender oils, one or more silica covering agents such as alkoxysilanes, polyols, or amines.

In particular, these compositions may be such that said grafted elastomer is extended using a paraffinic, aromatic or naphthenic oil, with a quantity of extender oil of between 0 and 50 phr.

Another subject of the invention is a process for the preparation of a cross-linkable rubber composition according to the invention. This process comprises:

(i) the preparation of a grafted diene elastomer comprising functional groups along its chain and having a molar ratio of units originating from conjugated dienes which is greater than 30%, said grafted elastomer being obtained by a radical grafting reaction performed in solution or without a solvent by means of a reagent of mercaptan type and intended to graft said groups on to the chain of a starting diene elastomer, said grafted elastomer being obtained by antioxidant treatment using at least one antioxidant comprising at least one aromatic amine function applied to said starting elastomer prior to said grafting reaction, (ii) the carrying out, at a maximum temperature of between 130° C. and 200° C., of a first stage of thermomechanical working of the constituents of said composition comprising said grafted elastomer and a reinforcing inorganic filler, with the exception of a cross-linking system, then (iii) the carrying out, at a temperature lower than said maximum temperature of said first stage, of a second stage of mechanical working during which said cross-linking system is incorporated.

Another subject of the invention is also a tread for a tire, which is such that it comprises a cross-linkable or cross-linked rubber composition such as that mentioned above, or alternatively which is such that it is formed of this composition.

Owing to the reduced hysteresis which characterizes a rubber composition according to the invention in the cross-linked state, it will be noted that a tire, the tread of which comprises said composition, has an advantageously reduced rolling resistance.

A tire according to the invention is such that it comprises this tread.

The aforementioned characteristics of the present invention, as well as others, will be better understood on reading the following description of several examples of embodiment of the invention, which are given by way of illustration and not of limitation.

Experimental Techniques Used for Characterizing the Polymers Obtained a) The SEC (size exclusion chromatography) technique was used to determine the distributions of molecular weights relative to samples of these polymers. Starting from standard products whose characteristics are described in Example 1 of European Patent Specification EP-A-692 493, this technique made it possible to evaluate, for a sample, a number-average molecular weight (Mn) which has a relative value, unlike the one determined by osmometry, and also a weight-average molecular weight (Mw). The polydispersity index (Ip=Mw/Mn) of this sample was deduced therefrom.

According to this technique, the macromolecules are separated physically according to their respective sizes when swollen, in columns filled with a porous stationary phase. Before implementing this separation, the sample of polymer is solubilized at a concentration of about 1 g/l in tetrahydrofuran.

A chromatograph sold under the name "WATERS" of model "150C" is used for the aforementioned separation. The elution solvent is tetrahydrofuran, the flow rate is 1 ml/min, the temperature of the system is 35° C. and the analysis time is 30 min. A set of two "WATERS" columns is used, the type being "STYRAGEL HT6E".

The injected volume of the polymer sample solution is 100 µl. The detector is a "WATERS" differential refractometer, the model number of which is "R401". Software for processing the chromatographic data is also used, the trade name of which is "WATERS MILLENNIUM".

b) An assay method using the $^1$H NMR technique was used, after esterification with an excess of diazomethane, which reagent is known to react with COOH functions, to calculate the amount of COOH functions (in meq/kg of polymer) and the number of corresponding functional units per chain of polymer.

More precisely, this method consists of obtaining, using diazomethane, methyl ester functions from the COOH functions which have been fixed to the elastomer, in order to provide indirect and quantitative access to the amounts of COOH functions by $^1$H NMR.

(i) First, the diazomethane is prepared as follows:

It is obtained by action of alcoholic potassium hydroxide solution on N-methyl-N-nitrosoparatoluenesulphonamide, in the presence of diethyl ether and at the temperature of melting ice. Then the ether phase containing the reagent is recovered by simple distillation.

The esterification reaction is then carried out in the following manner.

(ii) A sample of the elastomer which has been washed and dried in specific manner is solubilized in toluene, so as to be able to characterize it by analysis.

(iii) This specific preparation consists of treating the elastomer by three successive dissolution operations in toluene, respectively followed by coagulation operations in a mixture formed of acetone and water which is acidified to pH=2 with hydrochloric acid, in order to eliminate any traces of acidic compounds (stopper, antioxidant, catalytic residues, by-products such as isovaleric acid, in particular). Then the elastomer thus treated is dried in an oven at 50° C., in a vacuum and under a nitrogen atmosphere.

(iv) Then the ethereal solution containing the diazomethane is added thereto, such that there is an excess of reagent relative to the COOH functions. Hereafter, the polymer thus treated is coagulated in methanol. The polymer is then dried in an oven at ambient temperature and under a high vacuum by means of a vane pump.

(v) $^1$H NMR analysis is then performed in the following manner.

A sample of the polymer esterified in this way is solubilized in carbon disulphide. The $^1$H NMR signal is analyzed using a spectrometer marketed under the name BRUKER AC200. The characteristic signal of the three methyl protons of COOCH$_3$ provides quantitative access to the initial amount of COOH functions in the functional polymer.

In some cases, the amount of COOH functions is rapidly estimated using the infrared (IR) technique. This is made possible by comparing the integration ratio of the surface area of the carbonyl signal (1709 cm$^{-1}$) with the signal of the aromatic protons in the styrene (1602 cm$^{-1}$)

Analysis is performed on a film evaporated onto a KBr plate, the latter being produced after redissolving 1 g of dry rubber in 50 ml of toluene. The infrared spectrometer used is sold under the name BRUKER Vector 22.

c) For the polymers and the rubber compositions, the Mooney viscosities ML (1+4) at 100° C. are measured in accordance with Standard ASTM D-1646.

An oscillating consistometer such as described in Standard ASTM D-1646 is used. The Mooney plasticity is measured in accordance with the following principle: the composition in the uncured state (i.e. before curing) is molded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 N·m).

d) The glass transition temperatures Tg of the polymers are measured by means of a differential calorimeter ("differential scanning calorimeter").

EXAMPLE 1

Introduction of COOH Groups into Solutions of Elastomers Treated by Grafting of 3-mercaptopropionic Acid at a Level of 40 meq/kg 1) Starting Elastomer Used:

Copolymer of styrene and butadiene (SBR) prepared in solution having the following microstructure characteristics, determined by $^1$H NMR:

weight content of styrene units: 25.7% weight content of 1,2 (vinyl) linkages in the units resulting from butadiene: 43.0%.

This SBR has a Tg of −37° C. (with ΔT=7) and a Mooney viscosity ML(1+4) of 33.6.

2) Treatments Whether or not in Accordance with the Invention Applied to this Starting Elastomer:

a) A treatment according to the invention applied to this starting SBR consisted of an antioxidant treatment comprising the addition of 0.4 phr of 6-PPD (N-(1,3-dimethylbutyl)-N'-p-phenylenediamine) and of introducing COOH groups by grafting with part of the SBR thus antioxidized (SBR No. 3), the other part acting as a non-functional control elastomer in the rest of the example (SBR No. 1).

b) A treatment which is not in accordance with the invention consisted of carrying out the grafting without having first antioxidized the polymer (SBR No. 2).

3) Implementation of the Radical Grafting:

45 g of each of the antioxidized SBRs (SBR No. 1 and SBR No. $^3$) are dissolved in 404 ml of cyclohexane (or 315 g) in a 750 ml Steinie bottle. Heated to 80° C. after 10 minutes with stirring in a tank at 80° C., each polymer solution is bubbled with nitrogen for 10 minutes, then heated again to 80° C. in a tank for 10 minutes.

In parallel, a solution of lauroyl peroxide (Aldrich, 97%) in cyclohexane is prepared from peroxide powder which has first been bubbled in a 250 ml Steinie bottle. The quantity of peroxide introduced is such that the molar ratio mercaptan/peroxide is equal to 48 (quantities of mercaptan indicated in Table 1). This peroxide solution is introduced into the polymer solution, which had been prepared at 80° C. beforehand, via a double needle.

Following this, the 3-mercaptopropionic acid (Aldrich, 99%) is injected in the different quantities set forth in Table 1 using a syringe.

The bottle is then placed in the tank at 80° C. After 2 hours at 80° C., 6.4 ml of a solution of 40 g/l (or 0.255 g) 6-PPD in cyclohexane is added, and the bottle is placed back in the tank at 80° C. for 15 minutes. The reaction medium is then stripped in the presence of 10 ml 37%-strength hydrochloric acid (pH=2). The stripped polymer is roller-dried and finally dried in an oven at 50° C. at reduced pressure and in a stream of nitrogen.

In the event that one or two coagulations are performed in addition to the stripping (cf. Table 2), these are performed after redissolving in toluene (37.5 ml/g) with a mixture of water/acetone/HCl at 35% in the proportions: 1/4/1 by volume.

Table 1 hereafter sets forth the results obtained for these syntheses, in terms of Mooney viscosity ML(1+4), number-average molecular weight Mn (SEC technique), polydispersity index Ip (SEC technique), amount of COOH functions (IR technique) and yield.

TABLE 1

| SBR | Quantity of 6-PPD introduced into the SBR (assay) | Quantity of mercaptan introduced (meq./kg) | Final Mooney ML(1 + 4) | Mn g/mol (SEC) | Ip (SEC) | Amount of COOH groups (meq/kg) ($^1$H NMR) | Grafting yield (%) |
|---|---|---|---|---|---|---|---|
| SBR No. 1 | 0.4 phr (0.39) | — | 33.6 | 130871 | 1.16 | — | — |
| SBR No. 2 | 0 (<0.02) | 80 | 54 | 134603 | 1.22 | 46 | 58% |
| SBR No. 3 | 0.4 phr (0.39) | 160 | 40.5 | 133276 | 1.23 | 37 | 23% |

This Table 1 shows that the radical grafting of COOH groups on to SBR No. 2 which is devoid of antioxidant is accompanied by a change in macrostructure, as evidenced by the increase in the Mooney viscosity (+20.4 points). This Table 1 also shows that the presence of the antioxidant comprising an aromatic amine function in SBR No. 3 according to the invention prevents the change in macrostructure without inhibiting the grafting reaction. It will however be noted that the yield of the grafting reaction is better in the absence of the antioxidant comprising an aromatic amine function. From these results, it would also appear that in order to obtain an amount of functions which is close to 40 meq./kg, it is furthermore necessary to introduce mercaptan into the reaction medium when in the presence of an antioxidant comprising an aromatic amine function.

Furthermore, attempts were made to evaluate the effect of stripping and coagulation treatments carried out after the grafting reaction, for the SBRs which had been grafted in the presence or in the absence of the antioxidant comprising an aromatic amine function.

Table 2 below sets forth the value in meq./kg of the amount of COOH functions determined by NMR for each of the two grafted elastomers which have been "stripped" or alternatively "stripped" and coagulated once or twice.

TABLE 2

| Nature of the SBR | With 0.39 phr of 6-PPD |
|---|---|
| Post-grafting treatment | Amount of functions (IR) (meq./kg) |
| Stripping | SBR No. 3a: 57 |
| Stripping and 1 coagulation | SBR No. 3b: 54 |
| Stripping and 2 coagulations | SBR No. 3c: 56 |

This Table 2 shows that the amount of grafted COOH groups is in practice the same whatever the treatment carried out after the grafting reaction: stripping or stripping followed by coagulation(s). The stripping step therefore suffices to eliminate the mercaptan not grafted on to the elastomer.

In this example, the three elastomers SBR No. 1, SBR No. 2 and SBR No. 3a were used to prepare rubber compositions No. 1, No. 2 and No. 3a of tread type, each comprising silica as reinforcing filler.

Each of these compositions No. 1, No. 2 and No. 3a has the following formulation (expressed in phr: parts per hundred parts of elastomer):

| | |
|---|---|
| Elastomer | 100 |
| Silica (1) | 80 |
| Aromatic oil ("ENERDEX 65") (5) | 39.5 |
| Bonding agent (2) | 6.4 |
| ZnO | 2.5 |
| Stearic acid | 2 |
| Antioxidant (3) | 1.9 |
| Anti-ozone wax "C32ST" (6) | 1.5 |
| Sulphur | 1.2 |
| Sulphenamide (4) | 2 |
| Diphenylguanidine | 1.5 | where:
(1) = Silica "Zeosil 1165 MP" from Rhodia,
(2) = Bonding agent "Si69" from Degussa,
(3) = N-(1,3-dimethylbutyl)-N'-phenylenediamiamine,
(4) = N-cyclohexyl-2-benzothiazylsulphenamide,
(5) = Aromatic oil from Hansen & Rosenthal European
(6) = Antiozone wax from Repsol Each of the following compositions is produced, in a first stage of thermomechanical working, by two steps separated by a cooling phase, then, in a second, finishing, stage, by mechanical working.

The elastomer, two-thirds of the reinforcing filler, the coupling agent, the diphenylguanidine and the stearic acid, then, approximately one minute later, the rest of the reinforcing filler, the aromatic oil and the anti-ozone wax "C32ST", are introduced in succession into a laboratory internal mixer of "Banbury" type, the capacity of which is 400 cm$^3$, which is 70% filled and the initial temperature of which is approximately 90° C.

The first thermomechanical working step is performed for 4 to 5 minutes, until a maximum dropping temperature of about 160° C. is achieved. The elastomeric block is then recovered and cooled.

Then a second step of thermomechanical working is performed in the same mixer for 3 to 4 minutes, with addition of the antioxidant, until a maximum dropping temperature of about 160° C. is achieved.

The aforementioned first stage of thermomechanical working is thus effected, it being specified that the average speed of the blades during this first stage is 45 rpm.

The mixture thus obtained is recovered, is cooled and then, in an external mixer (homo-finisher), the sulphur and sulphenamide are added at 30° C., by mixing everything for 3 to 4 minutes (aforementioned second stage of mechanical working).

The compositions thus obtained are then calendered either in the form of sheets (of a thickness of 2 to 3 mm) or of thin films of rubber in order to measure their physical or mechanical properties, or in the form of profiled elements which can be used directly, after cutting out and/or assembly to the desired dimensions, for example as semi-finished products for tires, in particular for treads.

The cross-linking is carried out at 150° C. for 40 min.

It will be noted that all the zinc monoxide (ZnO) is introduced at 120° C. in the first step of thermomechanical working, in order to obtain the cross-linkable compositions No. 1, No. 2 and No. 3a.

The results are set forth in Table 3 below.

TABLE 3

| | Composition | | |
|---|---|---|---|
| | No. 1 | No. 2 | No. 3a |
| Elastomer | SBR No. 1 | SBR No. 2 | SBR No. 3a |
| ML (1 + 4) at 100° C. (rubber) | 30 | 49 | 38 |
| Properties in the non-cross-linked state | | | |
| ML(1 + 4) at 100° C. ("Mooney mixture") | 49 | 74 | 68 |
| Properties in the cross-linked state | | | |
| Shore A | 67.7 | 59.5 | 59.6 |
| ME10 | 5.56 | 3.53 | 3.59 |
| ME100 | 1.87 | 2.05 | 2.10 |
| ME300 | 2.04 | 2.75 | 2.76 |
| ME300/ME100 | 1.09 | 1.34 | 1.31 |
| Scott break index at 20° C. | | | |
| BL (MPa) | 18.5 | 20.91 | 20.01 |
| EB (%) | 527 | 484 | 487 |
| Losses 60° C. | 33.57 | 19.87 | 20.2 |
| Dynamic properties as a function of deformation | | | |
| Delta G* (MPa) at 23° C. | 4.34 | 0.29 | 0.32 |
| Tan (δ) max at 23° C. | 0.338 | 0.145 | 0.149 |

With regard to the properties in the cross-linked state, it will be noted, on one hand, that the ratio ME300/ME100 relating to compositions No. 2 and No. 3a (based on SBR No. 2 and SBR No. 3a respectively) is greater than that relating to composition No. 1 and, on the other hand, that the hysteresis properties (at low and high deformations) are greatly improved compared with those of said composition No. 1.

It will be noted that composition No. 3a according to the invention has a value of Mooney "mixture" which is less than that of composition No. 2 based on an elastomer comprising COOH functions along the chain without antioxidant.

In other words, composition No. 3a, based on SBR No. 3a, which comprises COOH functions along the chain, silica and characterized by the introduction of the entire ZnO at 120° C. during the first step of mixing of the first stage of thermomechanical working, has rubber properties in the cross-linked state which are improved compared with those of composition No. 1 because of a reduced hysteresis and compared with composition No. 2 because of an improved processing ability.

EXAMPLE 2

Tests of Grafting of COOH Groups by 3-mercaptopropionic Acid or Mercaptoundecanoic Acid, in the Presence or Absence of Lauroyl Peroxide.

The starting SBR used is the same as that of Example 1 (ML(1+4)=33.6)

A treatment according to the invention applied to this starting SBR consisted of an antioxidant treatment comprising the addition of 0.4 or 0.2 phr of 6-PPD (N-(1,3-dimethylbutyl)-N'-p-phenylenediamine) and grafting "as is" the SBR thus protected (SBR No. 4 or SBR No. 5, respectively).

The operating method used is the same as the one described in Example 1, unless indicated otherwise with regard to the nature and the quantities of the products added or the method of introduction of the mercaptan. The mercaptan was in fact added directly to the polymer solution as in Example 1 or to the peroxide solution. The operating conditions are summarized in Table No. 4.

TABLE 4

| Final SBR | Quantity of 6-PPD in the SBR | Nature and quantity of mercaptan introduced | Method of introduction of the mercaptan | Mercapto acid/ Lauroyl peroxide (molar ratio) |
|---|---|---|---|---|
| SBR No. 4a | 0.39 phr | Mercaptopropionic acid 150 meq./kg | In the peroxide solution | 48 |
| SBR No. 4b | 0.39 phr | Mercaptoundecanoic acid 150 meq./kg | | 48 |
| SBR No. 5a | 0.20 phr | Mercaptopropionic acid 150 meq./kg | In the polymer solution | 48 |
| SBR No. 5b | 0.20 phr | Mercaptopropionic acid 150 meq./kg | | No peroxide |

The results of these grafting operations are summed up in Table 5:

TABLE 5

| Final SBR | Final ML(1 + 4) | Mn g/mol (SEC) | Ip (SEC) | Amount of COOH groups (meq/kg) ($^1$H NMR) | Grafting yield (%) |
|---|---|---|---|---|---|
| SBR No. 4a | 42 | 132996 | 1.18 | 38 | 25 |
| SBR No. 4b | 41 | 142300 | 1.30 | 80 | 66 |
| SBR No. 5a | 49 | 134796 | 1.29 | 46 | 30.5 |
| SBR No. 5b | 35 | 129978 | 1.14 | 17 | 11 |

The results of this table confirm that the 6-PPD does not adversely affect the grafting and that, whatever the mercapto acid used, it prevents the change in macrostructure, all the more so if it is in a large quantity (SBR No. 4a has a macrostructure which is less degraded than SBR No. 5a for which the antioxidant was added in unusual proportions of 0.2 phr only, in order to demonstrate the influence of the quantity of antioxidant on the grafting). From these results, it is confirmed that the grafting yield is the higher the lower the amount of 6-PPD (SBR No. 4a has a less good grafting yield than SBR No. 5a).

Comparison of SBR No. 4a with SBR No. 3 of Example 1 shows that the method of introduction of the mercaptan has a negligible influence on the effectiveness of the grafting.

These results also show that the grafting can be carried out without peroxide to the benefit of the macrostructure but that the yield is very adversely affected thereby (SBR No. 5b has a less good grafting yield than SBR No. 5a).

EXAMPLE 3

Tests of Grafting of COOH Groups by 3-mercaptopropionic Acid on Different Polymers The starting polymers are SBRs of variable microstructure and a BR. All, before grafting, underwent a treatment according to the invention consisting of adding 0.4 phr of 6-PPD or 0.2 phr of 6-PPD plus 0.2 phr of BPH (2,2'-methylene bis-4-methyl-6-tert.butylphenol).

The operating method used for the grafting is the same as the one described in Example 1, unless indicated otherwise with regard to the quantities of products added. The characteristics of the starting polymers and the operating conditions are summarized in Table 6.

TABLE 6

| Final polymer (AO) | % 1-2 | % styrene | Mn g/mol and Ip (SEC) | ML (1 + 4) | Quantity of mercaptan introduced (meq./kg) | Mercapto acid/ Lauroyl peroxide (molar ratio) |
|---|---|---|---|---|---|---|
| SBR No. 6 (6-PPD) | 57.8 | 23.0 | 115238 1.84 | 50 | Non-grafted control | |
| SBR No. 7a (6-PPD) | 57.8 | 23.0 | 123512 2.15 | 57 | 70 | 48 |
| SBR No. 7b (6-PPD + BPH) | 60.0 | 24.0 | 128811 2.31 | 54 | 80 | 48 |
| SBR No. 8 (6-PPD) | 24.3 | 27.0 | 117314 2.07 | 55 | Non-grafted control | |
| SBR No. 9a (6-PPD) | 24.3 | 27.0 | 113517 2.04 | 54 | 220 | 48 |
| SBR No. 9b (6-PPD + BPH) | 25.0 | 28.0 | 117237 2.18 | 58 | 165 | 48 |
| SBR No. 10 (6-PPD) | 7.0 | 31.0 | 94608 2.76 | 54.5 | Non-grafted control | |
| SBR No. 11a (6-PPD) | 7.0 | 31.0 | 91279 3.11 | 62.2 | 450 | 30 |
| SBR No. 11b (6-PPD + BPH) | 7.0 | 31.0 | 94538 3.09 | 60 | 430 | 30 |
| SBR No. 12 (6-PPD) | 5.0 | 0 | 118176 2.19 | 30 | Control not grafted | |
| SBR No. 13 (6-PPD) | 5.0 | 0 | 110532 2.10 | 39.5 | 500 | 28 |

Table 7 brings together all the results of these grafting reactions:

TABLE 7

| Final polymer | Mn g/mol (SEC) | Ip (SEC) | ML (1 + 4) | Amount of COOH groups (meq/kg) ($^1$H NMR) | Grafting yield (%) |
|---|---|---|---|---|---|
| SBR No. 6 | 115238 | 1.84 | 50 | Non-grafted control | |
| SBR No. 7a | 123512 | 2.15 | 57 | 28 | 40 |
| SBR No. 7b | 128811 | 2.31 | 54 | 24 | 30 |
| SBR No. 8 | 117314 | 2.07 | 55 | Non-grafted control | |
| SBR No. 9a | 113517 | 2.04 | 54 | 12 | 5.5 |
| SBR No. 9b | 117237 | 2.18 | 58 | 21 | 12.7 |
| SBR No. 10 | 94608 | 2.76 | 54.5 | Non-grafted control | |
| SBR No. 11a | 91279 | 3.11 | 62.2 | 16 | 3.5 |
| SBR No. 11b | 94538 | 3.09 | 60 | 20.5 | 4.7 |
| SBR No. 12 | 118176 | 2.19 | 30 | Non-grafted control | |
| SBR No. 13 | 110532 | 2.10 | 39.5 | 18.5 | 3.7 |

It emerges from this table that the grafting applies to a wide range of polymers. These results demonstrate the existence of a relationship between the microstructure and the effectiveness of the grafting: the yield is higher, the greater the amount of vinyl, whatever the antioxidant present in the reaction medium during grafting (aromatic amine alone or in association with a phenol).

In this example, the eight elastomers SBR No. 6, SBR No. 7b, SBR No. 8b, SBR No. 9b, SBR No. 10, SBR No. 11b, BR No. 12 and BR No. 13 were used to prepare rubber compositions No. 6, No. 7, No. 8, No. 9, No. 10, No. 11, No. 12 and No. 13 of tread type, each comprising silica as reinforcing filler.

Each of these compositions No. 6 and No. 7 has the following formulation (expressed in phr: parts per hundred parts of elastomer):

| | |
|---|---|
| Elastomer | 75 |
| PB113 | 25 |
| Silica (1) | 80 |
| Aromatic oil ("ENERDEX 65") (5) | 37 |
| Bonding agent (2) | 6.4 |
| ZnO | 2.5 |
| Stearic acid | 2 |
| Antioxidant (3) | 1.9 |
| Anti-ozone wax "C32ST" (6) | 1.5 |
| Sulphur | 1.2 |
| Sulphenamide (4) | 2 |
| Diphenylguanidine | 1.5 | where:
(1) = Silica "Zeosil 1165 MP" from Rhodia,
(2) = Bonding agent "Si69" from Degussa,
(3) = N-(1,3-dimethylbutyl)-N'-phenylenediamiamine,
(4) = N-cyclohexyl-2-benzothiazylsulphenamide,
(5) = Aromatic oil from Hansen & Rosenthal European
(6) = Antiozone wax from Repsol Each of these compositions No. 8 and No. 9b has the following formulation (expressed in phr: parts per hundred parts of elastomer):

| | |
|---|---|
| Elastomer | 100 |
| Silica (1) | 50 |
| Bonding agent (2) | 8 |
| ZnO | 2.5 |
| Stearic acid | 2 |
| Antioxidant (3) | 2 |
| Paraffin | 1 |
| Sulphur | 1.2 |
| Sulphenamide (4) | 1.2 |
| Diphenylguanidine | 1 |
| ZBEC (5) | 0.2 | where:
(1) = Silica "Zeosil 1165 MP" from Rhodia,
(2) = Bonding agent "Si69" from Degussa,
(3) = N-(1,3-dimethylbutyl)-N'-phenylenediamiamine,
(4) = N-cyclohexyl-2-benzothiazylsulphenamide,
(5) = Zinc dibenzyldithiocarbamate Each of these compositions No. 10 and No. 11 has the following formulation (expressed in phr: parts per hundred parts of elastomer):

| Elastomer | 100 |
| --- | --- |
| Silica (1) | 50 |
| Bonding agent (2) | 8 |
| ZnO | 2.5 |
| Stearic acid | 2 |
| Antioxidant (3) | 2 |
| Paraffin | 1 |
| Sulphur | 1.2 |
| Sulphenamide (4) | 1.2 |
| Diphenylguanidine | 1 |
| ZBEC (5) | 0.2 | where:
(1) = Silica "Zeosil 1165 MP" from Rhodia,
(2) = Bonding agent "Si69" from Degussa,
(3) = N-(1,3-dimethylbutyl)-N'-phenylenediamiamine,
(4) = N-cyclohexyl-2-benzothiazylsulphenamide,
(5) = Zinc dibenzyldithiocarbamate Each of these compositions No. 12 and No. 13 has the following formulation (expressed in phr: parts per hundred parts of elastomer):

| Elastomer | 100 |
| --- | --- |
| Silica (1) | 80 |
| Aromatic oil ("ENERDEX 65") (5) | 39.5 |
| Bonding agent (2) | 6.4 |
| ZnO | 2.5 |
| Stearic acid | 2 |
| Antioxidant (3) | 1.9 |
| Anti-ozone wax "C32ST" (6) | 1.5 |
| Sulphur | 1.2 |
| Sulphenamide (4) | 2 |
| Diphenylguanidine | 1.5 | where:
(1) = Silica "Zeosil 1165 MP" from Rhodia,
(2) = Bonding agent "Si69" from Degussa,
(3) = N-(1,3-dimethylbutyl)-N'-phenylenediamiamine,
(4) = N-cyclohexyl-2-benzothiazylsulphenamide,
(5) = Aromatic oil from Hansen & Rosenthal European
(6) = Antiozone wax from Repsol Each of the following compositions No. 6, No. 7, No. 8, No. 9, No. 10, No. 11, No. 12 and No. 13 is produced, in a first stage of thermomechanical working, by two steps separated by a cooling phase, then, in a second, finishing, stage, by mechanical working.

There are introduced in succession, into a laboratory internal mixer of "Banbury" type, the capacity of which is 400 cm$^3$, which is 70% filled and the initial temperature of which is approximately 90° C., the elastomer, two-thirds of the reinforcing filler, the coupling agent, the diphenylguanidine and the stearic acid, then, approximately one minute later, the rest of the reinforcing filler, the aromatic oil and the anti-ozone wax "C32ST" or paraffin 6266.

The first thermomechanical working step is performed for 4 to 5 minutes, until a maximum dropping temperature of about 160° C. is achieved. The elastomeric block is then recovered and cooled.

Then a second step of thermomechanical working is performed in the same mixer for 3 to 4 minutes, with addition of the antioxidant, until a maximum dropping temperature of about 160° C. is achieved.

The aforementioned first stage of thermomechanical working is thus effected, it being specified that the average speed of the blades during this first stage is 45 rpm.

The mixture thus obtained is recovered, is cooled and then, in an external mixer (homo-finisher), the sulphur, sulphenamide and ZBEC (if any) are added at 30° C., by mixing everything further for 3 to 4 minutes (aforementioned second stage of mechanical working).

The compositions thus obtained are then calendered, either in the form of sheets (of a thickness of 2 to 3 mm) or of thin films of rubber in order to measure their physical or mechanical properties, or in the form of profiled elements which can be used directly, after cutting out and/or assembly to the dimensions desired, for example as semi-finished products for tires, in particular for treads.

The cross-linking is carried out at 150° C. for 40 min.

It will be noted that all the zinc monoxide (ZnO) is introduced at 120° C. during the first step of thermomechanical working, in order to obtain the cross-linkable compositions No. 6, No. 7, No. 8, No. 9, No. 10, No. 11, No. 12 and No. 13.

The results are set forth in Tables 8, 9, 10 and 11 below.

TABLE 8

| | Composition | |
| --- | --- | --- |
| | No. 6 | No. 7 |
| Elastomer | SBR No. 6 | SBR No. 7b |
| ML (1 + 4) at 100° C. (rubber) | 50.0 | 54.0 |
| Properties in the non-cross-linked state | | |
| ML(1 + 4) at 100° C. ("Mooney mixture") | 58 | 56 |
| Properties in the cross-linked state | | |
| Shore A | 62.3 | 56.3 |
| ME10 | 4.44 | 3.03 |
| ME100 | 1.64 | 1.59 |
| ME300 | 2.03 | 2.19 |
| ME300/ME100 | 1.24 | 1.37 |
| Scott break index at 20° C. | | |
| BL (MPa) | 18.97 | 21.76 |
| EB (%) | 512 | 576 |
| Losses 60° C. | 26.28 | 21.17 |
| Dynamic properties as a function of deformation | | |
| Delta G* (MPa) at 23° C. | 3.46 | 0.44 |
| Tan (δ) max at 23° C. | 0.348 | 0.174 |

With regard to the properties in the cross-linked state, it will be noted, on one hand, that the ratio ME300/ME100 relating to composition No. 7 (based on SBR No. 7b) is greater than that relating to composition No. 6 and, on the other hand, that the hysteresis properties (at low and high deformations) are greatly improved compared with those of said composition No. 6.

In other words, composition No. 7, based on SBR No. 7b which comprises COOH functions along the chain, silica and characterized by the introduction of the entire ZnO at 120° C. during the first step of mixing of the first stage of thermomechanical working, has rubber properties in the cross-linked state (in particular hysteresis properties at low deformations) which are distinctly improved compared with those of composition No. 6.

TABLE 9

| | Composition | |
| --- | --- | --- |
| | No. 8 | No. 9 |
| Elastomer | SBR No. 8 | SBR No. 9b |
| ML (1 + 4) at 100° C. (rubber) | 55.0 | 58.0 |

TABLE 9-continued

| | Composition | |
|---|---|---|
| | No. 8 | No. 9 |
| Properties in the non-cross-linked state | | |
| ML(1 + 4) at 100° C. ("Mooney mixture") | 56 | 74 |
| Properties in the cross-linked state | | |
| Shore A | 69.5 | 66.0 |
| ME10 | 7.28 | 5.91 |
| ME100 | 2.67 | 2.74 |
| ME300 | 3.43 | 4.06 |
| ME300/ME100 | 1.28 | 1.48 |
| Scott break index at 20° C. | | |
| BL (MPa) | 21.56 | 23.69 |
| EB (%) | 385 | 371 |
| Losses 60° C. | 23.17 | 18.10 |
| Dynamic properties as a function of deformation | | |
| Delta G* (MPa) at 23° C. | 2.87 | 0.53 |
| Tan (δ) max at 23° C. | 0.195 | 0.103 |

With regard to the properties in the cross-linked state, it will be noted, on one hand, that the ratio ME300/ME100 relating to composition No. 9 (based on SBR No. 9b) is greater than that relating to composition No. 8 and, on the other hand, that the hysteresis properties (at low and high deformations) are greatly improved compared with those of said composition No. 8.

In other words, composition No. 9, based on SBR No. 9b which comprises COOH functions along the chain, silica and characterized by the introduction of the entire ZnO at 120° C. during the first step of mixing of the first stage of thermomechanical working, has rubber properties in the cross-linked state (in particular hysteresis properties at low deformations) which are distinctly improved compared with those of composition No. 8.

TABLE 10

| | Composition | |
|---|---|---|
| | No. 10 | No. 11 |
| Elastomer | SBR No. 10 | SBR No. 11b |
| ML (1 + 4) at 100° C. (rubber) | 54.5 | 60.0 |
| Properties in the non-cross-linked state | | |
| MS (1 + 4) at 100° C. ("Mooney mixture") | 53.3 | 76.4 |
| Properties in the cross-linked state | | |
| Shore A | 69.2 | 66.6 |
| ME10 | 6.69 | 5.47 |
| ME100 | 2.14 | 2.25 |
| ME300 | 2.72 | 3.27 |
| ME300/ME100 | 1.27 | 1.45 |
| Scott break index at 20° C. | | |
| BL (MPa) | 26.26 | 20.41 |
| EB (%) | 475 | 347 |
| Losses 60° C. | 29.2 | 24.1 |
| Dynamic properties as a function of deformation | | |
| Delta G* (MPa) at 23° C. | 3.37 | 0.73 |
| Tan (δ) max at 23° C. | 0.233 | 0.140 |

With regard to the properties in the cross-linked state, it will be noted, on one hand, that the ratio ME300/ME100 relating to composition No. 11 (based on SBR No. 1 lb) is greater than that relating to composition No. 10 and, on the other hand, that the hysteresis properties (at low and high deformations) are greatly improved compared with those of said composition No. 10.

In other words, composition No. 11, based on SBR No. 11b which comprises COOH functions along the chain, silica and characterized by the introduction of the entire ZnO at 120° C. during the first step of mixing of the first stage of thermomechanical working, has rubber properties in the cross-linked state (in particular hysteresis properties at low deformations) which are distinctly improved compared with those of composition No. 10.

TABLE 11

| | Composition | |
|---|---|---|
| | No. 12 | No. 13 |
| Elastomer | BR No. 12 | BR No. 13 |
| ML (1 + 4) at 100° C. (rubber) | 30.0 | 39.5 |
| Properties in the non-cross-linked state | | |
| ML (1 + 4) at 100° C. ("Mooney mixture") | 80.4 | 95.1 |
| Properties in the cross-linked state | | |
| Shore A | 61.9 | 58.0 |
| ME10 | 4.59 | 3.72 |
| ME100 | 1.47 | 1.49 |
| ME300 | 1.47 | 1.67 |
| ME300/ME100 | 1.00 | 1.12 |
| Scott break index at 20° C. | | |
| BL (MPa) | 17.99 | 17.17 |
| EB (%) | 628 | 523 |
| Losses 60° C. | 23.7 | 20.6 |
| Dynamic properties as a function of deformation | | |
| Delta G* (MPa) at 23° C. | 3.05 | 0.69 |
| Tan (δ) max at 23° C. | 0.254 | 0.133 |

With regard to the properties in the cross-linked state, it will be noted, on one hand, that the ratio ME300/ME100 relating to composition No. 13 (based on BR No. 13) is greater than that relating to composition No. 12 and, on the other hand, that the hysteresis properties (at low and high deformations) are greatly improved compared with those of said composition No. 12.

In other words, composition No. 13, based on BR No. 13 which comprises COOH functions along the chain, silica and characterized by the introduction of the entire ZnO at 120° C. during the first step of mixing of the first stage of thermomechanical working, has rubber properties in the cross-linked state (in particular hysteresis properties at low deformations) which are distinctly improved compared with those of composition No. 12.

EXAMPLE 4

Tests of Grafting of COOH Groups by
3-mercaptoundecanoic Acid without a Solvent

The starting SBR used is the same as SBR No. 6 of Example 3 (ML(1+4)=50).

A treatment according to the invention applied to this starting SBR consisted of an antioxidant treatment comprising the addition of 0.4 or 0.2 phr of 6-PPD (N-(1,3-dimethylbutyl)-N'-p-phenylenediamine) and grafting "as is" the SBR thus antioxidized (SBR No. 14).

The operating method used is as follows:

The reaction is performed in the open air on a kneading implement of Brabender type kept at 40° C. or 100° C., for the entire duration of the operations, as indicated in Table 12.

40 g of rubber is added and preheated on the kneader for 2 minutes. The lauroyl peroxide (if any) is then added "as is" (in powder form), followed by the addition of mercaptoundecanoic acid, also in powder form. These two reagents are added in variable proportions according to the tests (see Table 12). The reaction mixture is kneaded for 5 minutes, then the Brabender is stopped and the rubber recovered, cooled and then analyzed.

The characteristics of the rubbers obtained are described in Table 13.

TABLE 12

| Final SBR | Reaction temperature | Quantity of mercaptan introduced (meq./kg) | Mercapto acid/ Lauroyl peroxide (molar ratio) |
|---|---|---|---|
| SBR No. 14a | Non-functional control | | |
| SBR No. 14b | 40° C. | 300 | 24 |
| SBR No. 14c | 40° C. | 350 | No peroxide |
| SBR No. 14d | 100° C. | 60 | No peroxide |

TABLE 13

| Final SBR | Final ML(1 + 4) | Mn g/mol (SEC) | Ip (SEC) | Amount of COOH groups (meq/kg) ($^1$H NMR) | Grafting yield (%) |
|---|---|---|---|---|---|
| SBR No. 14a | 50.0 | 115238 | 1.84 | Non-functional control | |
| SBR No. 14b | 50.2 | 122576 | 1.83 | 71 | 24 |
| SBR No. 14c | 46.0 | 120611 | 1.79 | 73 | 21 |
| SBR No. 14d | 56.7 | 124207 | 2.04 | 24 | 40 |

These results show that the grafting can be carried out without a solvent, at 40° C. and at 100° C., with or without peroxide. In the absence of peroxide, it is necessary to load with more mercapto acid in order to obtain the same amount of function as a test carried out with peroxide, as shown by SBRs Nos. 14b and 14c. As with the grafting in solution, the degradation of the macrostructure is less pronounced in the absence of peroxide. It also emerges from these tables that the change in macrostructure is all the more pronounced the higher the reaction temperature (the variation in viscosity is greater for SBR No. 14c than for SBR No. 14b, whereas the latter is carried out with six times more mercapto acid).

The invention claimed is:

1. A process for obtaining a grafted diene elastomer comprising functional groups along its chain, said process comprising a radical grafting reaction which is performed in solution or without a solvent by means of a mercaptan reagent having at least one functional group and which is intended to graft said groups on to the chain of the starting elastomer, wherein said process comprises a step of antioxidant treatment before said radical grafting reaction, by means of an antioxidant comprising at least one aromatic amine function.

2. The process according to claim 1, wherein said antioxidant is selected from the group consisting of naphthylamines, diphenylamines, p-phenylenediamines and mixtures of these compounds.

3. The process according to claim 1, wherein said antioxidant further comprises at least one phenol function.

4. The process according to claim 1, wherein at least one second antioxidant comprising at least one phenol function is used.

5. The process according to claim 4, wherein said second antioxidant is selected from the group consisting of trialkyl phenols, hydroquinones, polyphenols and mixtures of such compounds.

6. The process according to claim 1, wherein the total quantity of antioxidant(s) lies within a range from 0.2 phr to 1.0 phr.

7. The process according to claim 1, wherein said mercaptan reagent having at least one functional group comprises a functional group selected from the group consisting of hydroxyl, carbonyl, ether, amine, nitrile and silane groups, and said grafted elastomer comprises along its chain hydroxyl, carbonyl, ether, amine, nitrile or silane groups, respectively.

8. The process according to claim 7, wherein said mercaptan reagent having at least one functional group comprises a carbonyl functional group belonging to the family consisting of carboxylic acid, carboxylic acid ester, amide and ketone groups, and said grafted elastomer comprises along its chain carboxylic acid, carboxylic acid ester, amide or ketone groups.

9. The process according to claim 8, wherein said mercaptan reagent having at least one functional group comprises a carboxylic acid functional group, and said grafted elastomer comprises carboxylic acid groups along its chain.

10. The process according to claim 1, wherein said grafting reaction is carried out in the presence of a radical initiator.

11. The process according to claim 10, wherein the radical initiator is a peroxide.

12. The process for obtaining a grafted diene elastomer according to claim 1, wherein said starting elastomer comprises a molar ratio of units originating from conjugated dienes greater than 30%.

13. The process for obtaining a grafted diene elastomer according to claim 12, wherein said starting elastomer is:
a homopolymer obtained by polymerization in solution of
a conjugated diene monomer having 4 to 12 carbon atoms, or
a copolymer obtained by copolymerization in solution of one or more conjugated dienes together with one or more vinyl aromatic compounds having 8 to 20 carbon atoms.

14. The process for obtaining a grafted diene elastomer according to claim 1, wherein a second step of antioxidant treatment is carried out after the radical grafting reaction.

15. A grafted diene elastomer comprising functional groups along its chain which is obtained by the process according to claim 1.

16. A cross-linkable or cross-linked rubber composition, comprising at least one reinforcing inorganic filler and a grafted diene elastomer obtained by the process according to claim 12.

17. The composition according to claim 16, wherein said functional groups belong to the family consisting of hydroxyl, carbonyl, ether, amine, nitrile and silane groups.

18. The composition according to claim 16, wherein said functional groups are selected from the group consisting of carboxylic acid, carboxylic acid ester, amide and ketone groups.

19. The composition according to claim 16, wherein said functional groups are a carboxylic acid.

20. The composition according to claim 16, wherein said grafted elastomer is derived from:

a homopolymer obtained by polymerization in solution of a conjugated diene monomer having 4 to 12 carbon atoms, or a copolymer obtained by copolymerization in solution of one or more conjugated dienes together with one or more vinyl aromatic compounds having 8 to 20 carbon atoms.

21. The composition according to claim 20, wherein said grafted elastomer is derived from a butadiene/vinyl aromatic compound copolymer prepared in solution.

22. The rubber composition according to claim 16, wherein said grafted elastomer has a number-average molecular weight Mn which is greater than 100,000 g/mol.

23. The rubber composition according to claim 16, based on an elastomer matrix comprising said grafted elastomer in a majority proportion.

24. The rubber composition according to claim 16, which comprises an elastomer matrix which is formed of said grafted elastomer.

25. The rubber composition according to claim 16, including a reinforcing filler comprising a reinforcing inorganic filler, wherein said reinforcing inorganic filler is present in said reinforcing filler in a mass fraction greater than 50% and up to 100%.

26. A process for obtaining a cross-linkable composition comprising at least one reinforcing inorganic filler and a grafted diene elastomer, which comprises:
 (i) preparing a grafted diene elastomer obtained by the process according to claim 12;
 (ii) carrying out, at a maximum temperature of between 130° C. and 200° C., of a first stage of thermomechanical working of the constituents of said composition comprising said grafted elastomer and a reinforcing inorganic filler, with the exception of a cross-linking system, and
 (iii) carrying out, at a temperature lower than said maximum temperature of said first stage, of a second stage of mechanical working during which said cross-linking system is incorporated.

27. The tire tread which comprises the cross-linkable or cross-linked rubber composition according to claim 16.

28. The tire tread according to claim 27, formed of said cross-linkable or cross-linked rubber composition.

29. A tire having reduced rolling resistance comprising the tread according to claim 27.

* * * * *

UNITED STATES PATENT AND TRADEMARK OFFICE
CERTIFICATE OF CORRECTION

PATENT NO.         : 7,312,264 B2
APPLICATION NO. : 11/256986
DATED               : December 25, 2007
INVENTOR(S)       : Sylvie Gandon-Pain It is certified that error appears in the above-identified patent and that said Letters Patent is hereby corrected as shown below:

TITLE Page - item 75 Inventor's city name

Change "Lyons" to read -- Lyon --

Signed and Sealed this

Twenty-second Day of July, 2008

JON W. DUDAS
*Director of the United States Patent and Trademark Office*